(12) United States Patent
Lee et al.

(10) Patent No.: US 7,714,029 B2
(45) Date of Patent: May 11, 2010

(54) METHOD OF PRODUCING EXPANDABLE POLYSTYRENE BEADS WHICH HAVE EXCELLENT HEAT INSULATION PROPERTIES

(75) Inventors: Jin-Hee Lee, Ulsan (KR); Han-Bae Bang, Ulsan (KR); Hae-Ri Lee, Ulsan (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 12/132,229

(22) Filed: Jun. 3, 2008

(65) Prior Publication Data

US 2009/0030096 A1   Jan. 29, 2009

(30) Foreign Application Priority Data

Jul. 26, 2007   (KR) ..................... 10-2007-0074967
Oct. 5, 2007   (WO) ............... PCT/KR2007/004867

(51) Int. Cl.
*C08J 9/16*   (2006.01)
(52) U.S. Cl. ............................. 521/56; 521/57; 521/82; 521/83; 521/146
(58) Field of Classification Search .................. 521/56, 521/57, 82, 246
See application file for complete search history.

(56) References Cited

U.S. PATENT DOCUMENTS 6,130,265 A   10/2000   Glueck et al.

FOREIGN PATENT DOCUMENTS

| CA | 2290007 A1 | 11/1998 |
| DE | 198 28 250 | * 12/1999 |
| JP | 5-310987 A | 11/1993 |
| JP | 2005-002268 A | 1/2005 |
| KR | 10-2001-0012557 A | 2/2001 |
| KR | 10-2006-0030155 A | 4/2006 |
| KR | 100599847 B1 | 7/2006 |
| KR | 10-2007-0053953 A | 5/2007 |

* cited by examiner

*Primary Examiner*—Irina S Zemel
(74) *Attorney, Agent, or Firm*—Henry D. Coleman; R. Neil Sudol; William J. Sapone

(57) ABSTRACT

An expandable polystyrene bead production method, which is a two-step process, is disclosed. The method includes obtaining suspendable, homogenous micropellets from a mixed composition prepared by mixing graphite particles with a styrene-based resin and extruding the composition, and carrying out seed polymerization by suspending graphite-containing micropellets in water and adding a styrene-based monomer and an aromatic hydrocarbon having 6 to 10 carbon atoms, and impregnation by adding a blowing agent. The produced expandable polystyrene beads, which contain graphite particles, are considerably low in thermal conductivity. In addition, the expandable polystyrene beads exhibit a little change in the thermal conductivity over time due to the use of the graphite particles, so that the heat insulation property can be sustained for an extended period of time.

7 Claims, No Drawings

METHOD OF PRODUCING EXPANDABLE POLYSTYRENE BEADS WHICH HAVE EXCELLENT HEAT INSULATION PROPERTIES

TECHNICAL FIELD

The present invention relates to a method for producing expandable polystyrene beads which have excellent heat insulation properties, and more particularly to an expandable polystyrene bead production method which is a two-step process comprising extrusion and seed polymerization.

BACKGROUND ART

Various methods for producing polystyrene are known, generally using emulsion polymerization, suspension polymerization, dispersion polymerization, and so on. For example, Japanese Patent Unexamined Publication No. Hei 2-14222 teaches a polystyrene production method using emulsion polymerization. Methods for producing expandable polystyrene using suspension polymerization are disclosed in various patented literatures, including Japanese Patent Unexamined Publication No. Showa 46-15112, Japanese Patent Unexamined Publication No. Hei 5-317688, U.S. Pat. Nos. 5,559,202, 2,652,392, U.K. Patent No. 1188252, and Korean Patent Publication No. 10-1999-0024927.

However, the known methods for producing expandable polystyrene beads using suspension polymerization present several disadvantages, such as a large particle size distribution, an unwanted grade, creation of sludge or wastes, requiring a number of classification steps using a screening apparatus in order to yield pure products.

Another method for producing extruded polystyrene particles and expandable polystyrene beads is to use extrusion by adding palletized polystyrene particles with a blowing agent. However, in the course of adding the blowing agent to polystyrene, it is necessary to control dispersion of melted products and heat generated. In addition, during extrusion, the molecular weight of polystyrene beads may be reduced and additives used may be decomposed. In particular, the polystyrene beads produced by extrusion and expansion cannot fabricate molded articles having low density of 20 kg/m$^3$ or less.

Korean Patent Publication No. 10-2005-0111820 describes a method of preparing expandable polystyrene beads containing graphite, comprising suspending pellets produced by re-extruding general polystyrene pellets together with graphite in a reactor and impregnating by adding a blowing agent. According to this method, since extruded pellets are further extruded and the resultant re-extruded pellets are subjected to suspension and impregnation, extrusion processing costs of micropellets considerably increase. In addition, it is quite difficult to take additional treatment measures for achieving high functionality, such as high expandability, strength, or thermal stability.

In the expanding of the obtained expandable polystyrene beads containing graphite particles, conventional expanding conditions can be employed without any particular limitations. The expandable polystyrene beads containing graphite particles can be expanded to have a cell size of about 70-300 microns, and have various merits and advantages, including high expandability, excellent heat insulation properties, strength and absorptiveness.

DISCLOSURE

Technical Problem

The present invention has been made in view of the foregoing problems, and it is an object of the present invention to provide a novel method for producing expandable polystyrene beads containing graphite particles, by which thermal conductivity of the expandable polystyrene beads can be reduced and aging of thermal conductivity can be compensated for.

Another object of the present invention is to provide a novel method for producing high-yield, expandable polystyrene beads containing graphite particles having a desired particle size distribution, which is not attainable by ordinary suspension polymerization.

Still another object of the present invention is to provide a novel method for producing expandable polystyrene beads containing graphite particles, by which problems associated with products using graphite in suspension polymerization, e.g., a large cell size, non-uniformity of cell size, or the like, can be solved.

A further object of the present invention is to provide a novel method for producing expandable polystyrene beads containing graphite particles, a novel method for producing expandable polystyrene beads containing graphite particles, which can be used in various applications including high-quality, low-cost insulation materials by solving the problem of increased extrusion processing costs associated with the process of producing graphite-containing micropellets by adding graphite to extruded polystyrene pellets, melting, re-extruding, and impregnating the resultant product.

Technical Solution

In order to achieve the above objects, in one aspect of the present invention, there is provided a method for producing expandable polystyrene beads through seed polymerization using graphite-containing micropellets, having reduced thermal conductivity and exhibiting various physical properties by adding additives and adjusting molecular weights during the seed polymerization.

Advantageous Effects

The thus obtained expandable polystyrene beads containing graphite particles have considerably low thermal conductivity compared to conventional expandable polystyrene, and can sustain heat insulation properties for an extended period of time due to a slight change in the thermal conductivity over time, which is caused by addition of the graphite particles.

Best Mode

The present invention is achieved by a method for producing expandable polystyrene beads including obtaining suspendable, homogenous micropellets from a mixed composition prepared by mixing graphite particles with a styrene-based resin and extruding the composition, and carrying out seed polymerization by suspending graphite-containing micropellets in water and adding a styrene-based monomer and an aromatic hydrocarbon having 6 to 10 carbon atoms, and impregnation by adding a blowing agent.

In an embodiment of the present invention, in the obtaining of the suspendable, homogenous micropellets, the extruding is carried out using a single-extruder or twin-screw extruder with an under-water-cutting pelletizer or a water-cooled die-face pelletizer at an extrusion temperature ranging from about 200 to about 250° C., thereby obtaining suspendable, homogenous micropellets. However, the micropellets produced by the water-cooled die-face pelletizer exhibit poor uniformity in particle size distribution. Accordingly, in order to obtain particles having uniform sizes, the under-water-cutting pelletizer is preferably used in carrying out the extruding. The suspendable, homogenous micropellets produced by the extruding step preferably have an average volume of 2 mm³ or less so as to become suspendable using a suspension system employed in a general expandable polystyrene production process.

In an embodiment of the present invention, the graphite-containing micropellets resulting after the extruding step are produced using the under-water-cutting pelletizer, and have circular- or oval-shaped particles having average volumes of about 2 mm³ or less.

In an embodiment of the present invention, the styrene-based resin is a polymer and/or copolymer of a styrene-based monomer selected from the group consisting of styrenes; alkyl styrenes exemplified by ethylstyrene, dimethylstyrene, and para-methylstyrene; alpha-alkylstyrene exemplified by alpha-methylstyrene, alpha-ethylstyrene, alpha-propylstyrene, and alpha-butylstyrene; halogenated styrenes exemplified by chlorostyrene, and bromostyrene; and vinyl toluene, or a copolymer of a monomer that is copolymerizable with the styrene-based monomer, including acrylonitrile, butadiene, alkylacrylate such as methylacrylate, alkylmethacrylate such as methylmethacrylate, isobutylene, vinyl chloride, isoprene, and mixtures thereof.

In a preferred embodiment of the present invention, the weight average molecular weight of the styrene-based resin ranges from 180,000 to 300,000 g/mol.

In an embodiment of the present invention, the graphite particles used have a particle size ranging from about 0.1 to about 20 μm and are present in an amount ranging from about 0.1 to about 30% by weight relative the total weight of the styrene-based resin.

In an embodiment of the present invention, while carrying out seed polymerization by suspending graphite-containing micropellets in water and adding a styrene-based monomer, an initiator and an aromatic hydrocarbon having 6 to 10 carbon atoms, impregnation is carried out by adding a blowing agent. Here, any suspending agent and initiator can be used as long as they are generally used in polymerization of expandable polystyrenes. In the present invention, an inorganic dispersant was used as the suspending agent and two types of initiators having different initiation temperatures were used for initiating seed polymerization.

In addition, in order to impart versatile characteristics to a polymer, additives may be added during seed polymerization. In detail, an aromatic hydrocarbon having 6 to 10 carbon atoms, a cell adjusting agent, a flame retardant, or the like, may be used as the additives.

The dispersant may be any dispersant that can be used in polymerization of conventional expandable polystyrene, and examples thereof include inorganic dispersant; tricalcium phosphate, magnesium pyrophosphorate, organic dispersant; polyvinyl alcohol, methyl cellulose, polyvinyl pyrrolidone, and the like. In an embodiment of the present invention, tricalcium phosphate is used in an amount of about 0.5 to about 1.0% by weight, relative to 100% by weight of ultra-pure water.

Usable examples of the styrene-based monomer include styrenes; alkyl styrenes exemplified by ethylstyrene, dimethylstyrene, and para-methylstyrene; alpha-alkylstyrene exemplified by alpha-methylstyrene, alpha-ethylstyrene, alpha-propylstyrene, and alpha-butylstyrene. The monomer is preferably used in an amount of about 10 to about 90% by weight relative to the total weight of the graphite-containing, expandable polystyrene beads. A variety of types of highly functional, physically versatile products can be manufactured according to the kind and amount of monomer used.

As the initiator, any initiator can be used as long as it can be generally used in polymerization of expandable polystyrenes. In an embodiment of the present invention, two kinds of initiator, that is, benzoyl peroxide (BPO), tertiarybutyl peroxybenzoate (TBPB), are used in each amount ranging from about 0.1 to about 0.5% by weight relative to 100% by weight of the styrene-based monomer added.

Examples of the cell adjusting agent include polyethylene wax, ethylene bisstearamide, calcium carbonate, talc, clay, silica, diatomite, citric acid, and sodium bicarbonate, and the cell adjusting agent is preferably used in an amount ranging from about 0.1 to about 3% by weight relative to 100% by weight of the expandable polystyrene beads containing graphite particles. The use of the cell adjusting agent reduces cell sizes, thereby improving heat insulation properties and physical properties of molded articles.

Examples of the flame retardant include brome-based flame retardants such as hexabromocyclodecane, tetrabromocyclooctane, tetrabromo vinyl cyclohexane, 2,2'(4-allyloxy-3,5-dibromophenyl)propane, or tribromophenyl allyl ether, general chlorine- or phosporus-based flame retardants, and so on, and hexabromocyclododecane is preferred. The flame retardant is preferably used in an amount ranging from about 0.1 to about 5.0% by weight, relative to 100% by weight of the expandable polystyrene beads containing graphite particles.

The aromatic hydrocarbon having 6 to 10 carbon atoms is preferably used in an amount ranging from about 0.1 to about 5.0% by weight, more preferably from about 0.1 to about 1.0% by weight, relative to 100% by weight of the expandable polystyrene beads containing graphite particles.

If the amount of the aromatic hydrocarbon used is too small, the shortage gives rise to deterioration in the expandability of the expandable polystyrene beads and makes it difficult to attain spherical polystyrene beads from the micropellets. On the other hand, if the amount of the aromatic hydrocarbon used is too excessive, the excess may undesirably lower thermal stability of final molded articles. Examples of the aromatic hydrocarbon serving as a solvent include benzene, toluene, p-xylene, o-xylene, m-xylene, ethylbenzene, propylbenzene, and i-propylbenzene, and toluene or ethylbenzene is preferably used.

As the blowing agent, a C4~C6 blowing agent used in the manufacture of ordinary expandable polystyrene can be used, and usable examples thereof include butane, i-butane, n-pentane, i-pentane, neo-pentane, cyclopentane, and halogenated hydrocarbons. In a preferred embodiment, examples of the blowing agent include n-pentane, i-pentane, cyclopentane, and so on, and may be used in an amount of about 4 to about 15% by weight.

In an embodiment of the present invention, the graphite-containing micropellets are subjected to seed polymerization and impregnation at the same time in the following manner.

In more detail, ultrapure water, graphite-containing micropellets, and a dispersant were injected into a reactor to maintain dispersion. When this procedure is completed, the temperature of the reactor is elevated to/maintained at a temperature ranging from about 60° C. to about 90° C., followed by slowing adding to the reactor a styrene-based monomer, an initiator, a cell adjusting agent, a flame retardant, and an aromatic hydrocarbon having 6 to 10 carbon atoms for more than 2 to 3 hours. Thereafter, an entrance of the reactor is closed and the remainder of the styrene-based monomer is slowly added to the reactor, which is performed while elevating the temperature of the reactor maintained at the temperature ranging from about 60° C. to about 90° C. to a temperature ranging from about 100° C. to about 130° C. for more than 3 to 6 hours, thereby completing polymerization. At this stage, a blowing agent is added to the reactor to carry out impregnation. After the addition of the blowing agent, the impregnation is maintained at a temperature ranging from about 100° C. to about 130° C. for more than 3 to 6 hours, thereby completing a novel seed polymerization process of expandable polystyrene beads containing graphite particles.

According to the present invention, the method for producing expandable polystyrene beads containing graphite particles is achieved by obtaining suspendable, homogenous micropellets from a mixed composition prepared by mixing graphite particles with a styrene-based resin and extruding the composition; and carrying out seed polymerization by suspending graphite-containing micropellets in water and adding a styrene-based monomer, an initiator and an aromatic hydrocarbon having 6 to 10 carbon atoms, and impregnation by adding a blowing agent.

The present invention will be more specifically explained in the following examples. However, it should be understood that the following examples are intended to illustrate the present invention and not to limit the scope of the present invention in any manner.

EXAMPLE 1

Preparation of Expandable Polystyrene Beads Containing Graphite Particles (Using Under Water Cutting Pelletizer)

To 100 kg of polystyrene(GP 150, Kumho Petrochemical, Korea) was added 10 kg of graphite (HCN-905, Hyundaicoma Ind, Co., Korea) and mixed, the mixed composition was melted in a twin-screw extruder at a temperature of about 230° C., and subjected to pelletization using a under-water-cutting pelletizer to yield uniform-sized graphite-containing micropellets having an average volume of 2.0 mm$^3$ about or less. 0.2 kg of a dispersant (Tricalcium phosphate; Dubon Yuhwa) was added to 40 kg of ultrapure water in a 100 L reactor, and stirred, followed by adding 20 kg of the graphite-containing micropellets to the resultant reactor. Then, the temperature of the reactor was elevated up to 60° C., and a solution obtaining by dissolving 1 kg of a flame retardant (hexabromocyclododecane commercially available in the trade name of CD75P™, GLC), 0.05 kg of a low-temperature initiator(benzoyl peroxide; Hansol Chemical, Korea), and 0.03 kg of a high-temperature initiator (t-butyl peroxybenzoate; Hosung Chemex, Korea), was added to 5 kg of a styrene-based monomer(Styrene Monomer; SK, Korea) for 2 hours. Next, an entrance of the reactor was closed and 15 kg of styrene-based monomer was slowly added to the reactor while elevating the temperature of the reactor maintained at the temperature ranging from about 60° C. to about 125° C. for about 3.5 hours, thereby carrying out polymerization. After completing the polymerization, 3 kg of a blowing agent (Pentane; SK) was injected into the reactor at 125° C. under nitrogen pressure and impregnation was carried out for 5 hours while keeping the final pressure of the reactor at 13 kgf/cm$^2$. Then, the temperature was cooled down to 30° C. or below and the final product was drawn out from the reactor. The product was rinsed and dried, followed by coating with a blending agent used for conventional expandable polystyrene for evaluation of physical properties.

EXAMPLE 2

Preparation of Expandable Polystyrene Beads Containing Graphite Particles (Using Water-Cooled Die-Face Pelletizer)

To 100 kg of polystyrene(GP 150, Kumho Petrochemical, Korea) was added 10 kg of graphite (HCN-905, Hyundaicoma Ind, Co., Korea) and mixed. The mixed composition was melted in a twin-screw extruder at a temperature of about 230° C., and subjected to pelletization using a water-cooled die-face pelletizer to yield uniform-sized graphite-containing micropellets having an average volume of 2.0 mm$^3$ about or less.

The seed polymerization/impregnation steps are carried out in the same manner as in Example 1. The produced final product was rinsed and dried, followed by coating with a blending agent used for conventional expandable polystyrene for evaluation of physical properties.

EXAMPLE 3

Preparation of Expandable Polystyrene Beads Containing Graphite Particles (Addition of Cell Adjusting Agent) Graphite-containing micropellets were produced in the same manner as in Example 1. The core polymerization step was carried out in the same manner as in Example 1, except that 0.05 kg of a cell adjusting agent was added to the reactor at 60° C. (Ethylene bisstearamide; Sunkoo Chemical, Korea) to carry out core polymerization/impregnation. The produced final product was rinsed and dried, followed by coating with a blending agent used for conventional expandable polystyrene for evaluation of physical properties.

EXAMPLE 4

Preparation of Expandable Polystyrene Beads Containing Graphite Particles (Addition of Solvent)

Graphite-containing micropellets were produced in the same manner as in Example 1. The seed polymerization step was carried out in the same manner as in Example 1, except that 0.05 kg of a solvent(Toluene; Chemitech, Korea) was added to the reactor at 60° C. to carry out seed polymerization/impregnation. The produced final product was rinsed and dried, followed by coating with a blending agent used for conventional expandable polystyrene for evaluation of physical properties.

Comparative Example 1

Preparation of Expandable Polystyrene Beads Free of Graphite Particles

Polystyrene(GP 150, Kumho Petrochemical, Korea) was melted at 230° C. in a twin-screw extruder and palletized using an under-water-cutting pelletizer to yield micropellets having an average volume of 2.0 mm$^3$ about or less. The seed polymerization step was carried out in the same manner as in Example 1, and the produced final product was rinsed and dried, followed by coating with a blending agent used for conventional expandable polystyrene for evaluation of physical properties.

Comparative Example 2

Preparation of Expandable Polystyrene Beads Containing Graphite Particles (Simple Impregnation, Rather than Seed Polymerization, of Micropellets)

To 100 kg of polystyrene(GP 150, Kumho Petrochemical, Korea) were added 5 kg of graphite (HCN-905, Hyundaicoma Ind, Co., Korea) and 1 kg of a flame retardant (HBCD$^{HT}$, Albemarle Corp.) and mixed. The mixed composition was melted in a twin-screw extruder at a temperature of about 230° C., and subjected to pelletization using a water-cooled die-face pelletizer to yield uniform-sized graphite-containing micropellets having an average volume of 2.0 mm³ about or less. 0.2 kg of a dispersant (Tricalcium phosphate; Dubon Yuhwa) was added to 40 kg of ultrapure water in a 100 L reactor, and stirred, followed by adding 40 kg of the graphite-containing micropellets to the resultant reactor. Next, an entrance of the reactor was closed and the temperature of the reactor was elevated up to 110° C. Then, 3 kg of a blowing agent(Pentane; SK) was injected into the reactor under nitrogen pressure and impregnation was carried out for 5 hours while keeping the final pressure of the reactor at 13 kgf/cm². Thereafter, the temperature was cooled down to 30° C. or below and the final product was drawn out from the reactor. The product was rinsed and dried, followed by coating with a blending agent used for conventional expandable polystyrene for evaluation of physical properties.

In Tables 1 and 2 below, densities of polystyrene bead samples to be evaluated are all 30 kg/m³, and evaluation of various physical properties is performed in the following manner.

1) 5-minute expandability: Expansion times (folds) when expanding 5 minutes in steam pressure of 0.3K
2) Sphericalness: Width-to-length ratio of expandable polystyrene bead (1≧)
3) Yield of main size particles: Yield in % by weight particle sizes in the range of 14 Mesh Pass~18 Mesh On by Korean Industrial Standard Sieve
4) cell size: Average diameter in mm between opposite walls of bead measured by a microscope
5) Absorptiveness: Value in g/100 cm², obtained by dividing an amount of water absorbed by a surface area of expandable polystyrene thermal insulation material using the method of testing the ahsorptiveness of expandable polystyrene thermal insulation materials defined under the Korean Industrial Standard KS M 3808
6) Compressive strength: Value in kgf/cm² measured using the method of testing the compressive strength of expandable polystyrene thermal insulation materials defined under the Korean Industrial Standard KS M 3808
7) Flexural strength: Value in kgf/cm² measured using the method of testing the flexural strength of expandable polystyrene thermal insulation materials defined under the Korean Industrial Standard KS M 3808
8) Self-extinguishability: Value in sec, measured using the method of testing flammability of expandable polystyrene thermal insulation materials defined under the Korean Industrial Standard KS M 3808
9) Thermal conductivity: Measured by a thermal conductivity measuring device manufactured by Netzsch (HFM 436/3/1)

Test sample size: 30 cm×30 cm×5 cm

TABLE 1

Physical properties based on bead method of EPS thermal insulation board No. 1 (Density: 30 kg/m³ or more)

|  | Example 1 | Example 2 | Example 3 | Example 4 | Comparative Example 1 | Comparative Example 2 |
|---|---|---|---|---|---|---|
| 5-minute expandability (times) | 75 | 76 | 75 | 74 | 76 | 65 |
| Sphericalness (1≧) | 0.89 | 0.9 | 0.88 | 0.99 | 0.89 | 0.87 |
| Yield of main size particles (%) | 95 | 80 | 96.1 | 94.8 | 95.5 | 97 |
| cell size (μm) | 80~120 | 80~120 | 80~100 | 80~120 | 80~120 | 80~120 |
| Absorptiveness (g/100 cm2) | 0.8 | 0.76 | 0.75 | 0.76 | 0.74 | 0.8 |
| Compressive strength (kgf/cm2) | 1.88 | 1.84 | 1.95 | 1.85 | 1.9 | 1.87 |
| Flexural strength (kgf/cm2) | 3.91 | 3.88 | 3.94 | 3.85 | 3.93 | 3.89 |
| Self-Extinguishability (sec) | 0.94 | 0.95 | 0.93 | 1.1 | 0.88 | 3.7 |

TABLE 2

Thermal conductivity (Unit: W/mk) based on bead method of EPS thermal insulation board No. 1 (Density: 30 kg/m³ or more)

|  | Example 1 | Example 2 | Example 3 | Example 4 | Comparative Example 1 | Comparative Example 2 |
|---|---|---|---|---|---|---|
| Initial thermal conductivity | 0.0279 | 0.0280 | 0.0278 | 0.0278 | 0.034 | 0.0280 |
| Thermal conductivity after 3 months | 0.0311 | 0.0311 | 0.0310 | 0.0312 | 0.0365 | 0.0312 |

As confirmed from Tables 1 and 2, the expandable polystyrene beads containing graphite particles produced by the novel seed polymerization process satisfied all physical properties that are desirably required by general expandable polystyrene. From the standpoint of thermal conductivity, in comparison with the expandable polystyrene beads free of graphite, i.e., in Comparative Example 1, the expandable polystyrene beads containing graphite particles produced in the manner described in Examples of the present invention demonstrated noticeably reduced levels in both initial thermal conductivity and thermal conductivity after 3 months. Further, in the seed polymerization process according to the present invention, like in Example 4, it was confirmed that the addition of a solvent improved the spherical degree of micropellets. Moreover, although a difference in the extrusion methods did not make a significant difference between physical properties of final products of Example 1 and 2, it is rather difficult to obtain uniform-sized graphite-containing micropellets due to a difference in the palletizing type in the extrusion, suggesting that particle sizes of the final products were distributed over a wide range. In Example 3, it was confirmed that the addition of the cell adjusting agent allowed bead size to be much smaller and uniformly distributed. Finally, as confirmed from data of Comparative Example 2, when a flame retardant was added during extrusion, severe decomposition of the flame retardant occurred at high temperature, thereby lowering the flame retardancy of the final molded article.

INDUSTRIAL APPLICABILITY

The present invention provides a novel method for producing expandable polystyrene beads containing graphite particles. According to the method of the present invention, several problems associated with expandable polystyrene beads containing graphite particles in suspension polymerization, e.g., a large cell size, non-uniformity in cell size, or the like, can be solved, and provide a desired particle size distribution, which are not attainable by ordinary suspension polymerization. Further, since the quantity of micropellets for one reaction batch is reduced and seed polymerization is carried out, compared to a case of producing graphite-containing micropellets by extrusion and impregnation, the processing costs can be considerably reduced. In addition, the expandable polystyrene beads according to the present invention have excellent heat insulation properties and are used in various applications including insulation materials for buildings, packing materials, and the like.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A method for producing expandable polystyrene beads comprising:
    obtaining suspendable, homogenous micropellets from a mixed composition prepared by mixing graphite particles with a styrene-based resin and extruding the composition; and
    carrying out seed polymerization by suspending graphite-containing micropellets in water and adding a styrene-based monomer and an aromatic hydrocarbon having 6 to 10 carbon atoms, and impregnation by adding a blowing agent.

2. The method of claim 1, wherein the styrene-based resin is a polymer of at least one monomer selected from the group consisting of styrene, ethylstyrene, dimethylstyrene, para-methylstyrene, alpha-methylstyrene, alpha-ethylstyrene, alpha-propylstyrene, alpha-butylstyrene, chlorostyrene, and bromostyrene, or a copolymer of the at least one monomer and at least one monomer selected from the group consisting of vinyl toluene, acrylonitrile, butadiene, methylacrylate, methylmethacrylate, isobutylene, vinyl chloride and isoprene, and the weight average molecular weight of the styrene-based resin ranges from 180,000 to 300,000 g/mol.

3. The method of claim 1, wherein the graphite particles used have a particle size ranging from about 0.1 to about 20 μm and are present in an amount ranging from about 0.1 to about 30% by weight relative the total weight of the styrene-based resin.

4. The method of claim 1, wherein the weight ratio of the graphite-containing micropellets to the styrene-based monomer is 10~90:90~10.

5. The method of claim 1, wherein the styrene-based monomer is at least one monomer selected from the group consisting of styrene, ethylstyrene, dimethylstyrene, para-methylstyrene, alpha-methylstyrene, alpha-ethylstyrene, alpha-propylstyrene, and alpha-butylstyrene.

6. The method of claim 1, wherein the aromatic hydrocarbon having 6 to 10 carbon atoms is selected from the group consisting of benzene, toluene, p-xylene, o-xylene, m-xylene, ethylbenzene, propylbenzene, and i-propylbenzene, and is used in an amount of about 0.1 to about 5% by weight relative to the total weight of the graphite-containing, expandable polystyrene beads.

7. The method of claim 1, wherein the impregnation is carried out by the addition of the blowing agent and the blowing agent is added in an amount of about 4 to about 15% by weight relative to the total weight of the graphite-containing, expandable polystyrene beads.

* * * * *